United States Patent
Qin et al.

(10) Patent No.: US 7,530,143 B2
(45) Date of Patent: May 12, 2009

(54) HINGE MECHANISM FOR A FOLDABLE ELECTRONIC DEVICE

(75) Inventors: Shui-Yuan Qin, Shenzhen (CN); Xing-Huang Luo, Shenzhen (CN); Hsiao-Hua Tu, Tu-Cheng (TW); Chia-Hua Chen, Tu-Cheng (TW)

(73) Assignees: Shenzhen Futaihong Precision Industry Co., Ltd., ShenZhen, Guandong Province (CN); Sutech Trading Limited, Tortola (VG)

( * ) Notice: Subject to any disclaimer, the term of this patent is extended or adjusted under 35 U.S.C. 154(b) by 484 days.

(21) Appl. No.: 11/303,491

(22) Filed: Dec. 16, 2005

(65) Prior Publication Data

US 2006/0137142 A1    Jun. 29, 2006

(30) Foreign Application Priority Data

Dec. 23, 2004    (CN)    .................... 2004 1 0091872

(51) Int. Cl.
    *E05F 1/14*    (2006.01)
(52) U.S. Cl. .......................... 16/285; 16/307
(58) Field of Classification Search .............. 16/285, 16/281, 304–307, 308; 361/680–683; 379/433.12, 379/433.13; 455/90.3, 575.1, 575.3, 575.4, 455/575.8, 550.1
See application file for complete search history.

(56) References Cited

U.S. PATENT DOCUMENTS

| 2,713,820 | A | * | 7/1955 | Shinjiro | ...................... | 101/126 |
| 3,351,976 | A | * | 11/1967 | Gionet | ......................... | 16/323 |
| 6,065,187 | A | * | 5/2000 | Mischenko | .................. | 16/341 |
| 6,070,298 | A |  | 6/2000 | Sorimachi |  |  |
| 6,493,542 | B1 |  | 12/2002 | Frohlund |  |  |
| 2004/0020012 | A1 | * | 2/2004 | Gupte | ......................... | 16/303 |
| 2005/0257343 | A1 | * | 11/2005 | Gupte | ......................... | 16/330 |
| 2006/0085947 | A1 | * | 4/2006 | Ge et al. | ...................... | 16/303 |
| 2006/0230578 | A1 | * | 10/2006 | Renke et al. | .................. | 16/289 |

* cited by examiner

*Primary Examiner*—Chuck Y. Mah
(74) *Attorney, Agent, or Firm*—Steven M. Reiss

(57) ABSTRACT

A hinge mechanism includes a main shaft (2), a torsion spring (6) and a housing (8). The main shaft has a first shaft end (20) and an opposite second shaft end (21). The main shaft includes a stopping mechanism (26) provided at the first shaft end. The torsion spring surrounds the main shaft. The torsion spring has two ends and a substantially hollow interior. The housing is cylinder-shaped and hollow, having a first housing end and a second housing end with a shaft-receiving opening. The main shaft and the torsion spring are inserted into the housing. The stopping mechanism stops the main shaft from becoming disassembled from the housing. The main shaft is inserted into the torsion spring and received in the shaft-receiving opening of the housing. Also included is an electronic device having such a hinge mechanism. The hinge mechanism is easily manufactured and has a nice interchangeability.

14 Claims, 5 Drawing Sheets

HINGE MECHANISM FOR A FOLDABLE ELECTRONIC DEVICE

BACKGROUND OF THE INVENTION

1. Field of the Invention

The present invention generally relates to hinge mechanisms and, more particularly, to a hinge mechanism for hinging together housings of a foldable electronic device, such as a mobile phone or a PDA (Personal Digital Assistant).

2. Discussion of the Related Art

Many mobile phones and other portable electronic devices have two housings rotatably joined by a type of hinge that allows the housings to fold upon one another. Many such foldable mobile phones have most of the electronics in one housing, called the main housing, and fewer electronics in the other housing, called the cover. Other such foldable mobile phones have all the electronics in the main housing, with the cover serving only to cover a keypad and a display of the main housing. The main housing and the cover are connected together by a hinge mechanism. A typical hinge mechanism for foldable mobile phones and other portable electronic devices incorporate a torsion spring to achieve the rotation between the main housing and the cover in order to help the device to selectably remain closed or open.

One such kind of hinge mechanism is disclosed in U.S. Pat. No. 6,493,542, the contents of which are hereby incorporated by reference thereto. Referring to FIG. 1 of the present application, the hinge mechanism includes a sleeve 91, a torsion spring 92, and a main shaft 93. The sleeve 91 is substantially a hollow cylinder, with an open end and an opposite closed end. Disposed proximate the opposite closed end is an end portion 912 for latching with a cover section (not shown) of a foldable mobile phone (also not illustrated). Additionally, near the opposite closed end but opposing the end portion 912 is defined a blind receiving hole 914, with inner threads. A given finger 922, 924 extends from the two ends of the torsion spring 92, respectively. The main shaft 93 has a fixing portion 932 at one end thereof and a flange 934 at another opposite end. The fixing portion 932 has outer threads defined thereon.

In assembly, the torsion spring 92 is received in the sleeve 91. The finger 924 is engaged with a body section (not shown) of the foldable mobile phone. The main shaft 93 is inserted into the sleeve 91, and the fixing portion 932 is mounted into the blind receiving hole 914 of the sleeve 91. The hinge mechanism thus is completely assembled. The duly assembled hinge mechanism is then received in the body section of the foldable mobile phone. The end portion 912 is engaged with a cover section (not shown), and the finger 924 is operative with the body section. When the cover section is closed, the torsion spring 92 has a predetermined torsion. At the same time, the cover section is mated through a locking mechanism (not shown), such as a magnet. The magnetic force can make the cover section close to the body section.

When in use, the locking mechanism is released, and the cover section is opened via the torsion of the spring 92. The structure of the hinge mechanism is simple, and the operation is convenient. However, the torsion force of the whole hinge mechanism suffers from the end portion 912 of the sleeve 91. The end portion 912 is small and thus requires a higher strength. Furthermore, the impact force burdens the body section and the cover section. The body section and the cover section, as such, are easily worn, thereby shortening the working lifetime of the foldable mobile phone. Moreover, the body section must be specially constructed in order to permit engagement thereof with the finger 924. Therefore, the hinge mechanism has a poor exchangeability (i.e., not readily interchangeable), which could increase the cost of the mobile phones employing such a hinge mechanism.

What is needed, therefore, is a new hinge mechanism that overcomes the above-described problems.

SUMMARY OF THE INVENTION

The present hinge mechanism includes a main shaft, a torsion spring, and a housing. The main shaft has a first shaft end and an opposite second shaft end. The main shaft further includes a stopping mechanism, provided at the first shaft end. The torsion spring surrounds the main shaft. The torsion spring has two ends and a substantially hollow interior. The housing is cylinder-shaped and hollow, having a first housing end and a second housing end. The first housing end thereof is open and sized to receive the torsion spring therein. The second housing end has a shaft-receiving opening sized and configured to receive the main shaft therein. The torsion spring is inserted into the housing. The main shaft is inserted into the torsion spring and received in the second opening of the housing. The stopping mechanism prevents the main shaft from becoming disassembled from the housing.

An electronic device includes a main housing, a cover, and the present hinge mechanism. The hinge mechanism is used to rotatably hinge the main housing and the cover. The housing and the main shaft of the present hinge mechanism respectively engage with the main housing and the cover.

It is unnecessary to provide any special structure within the main housing and/or the cover of the electronic device, so the electronic device is easily manufactured and assembled. In addition, the hinge mechanism has a nice exchangeability and could potentially be employed in any of a variety of situations in which it desired that a hinge be configured for selectably maintaining one of an open and closed position.

Other advantages and novel features of preferred embodiments of the present invention will become more apparent from the following detailed description when taken in conjunction with the accompanying drawings, in which:

BRIEF DESCRIPTION OF THE DRAWINGS

Many aspects of the present hinge mechanism can be better understood with reference to the following drawings. The components in the drawings are not necessarily to scale, the emphasis instead being placed upon clearly illustrating the principles of the present hinge mechanism. Moreover, in the drawings, like reference numerals designate corresponding parts throughout the several views.

DETAILED DESCRIPTION OF PREFERRED EMBODIMENTS

Figure 1:
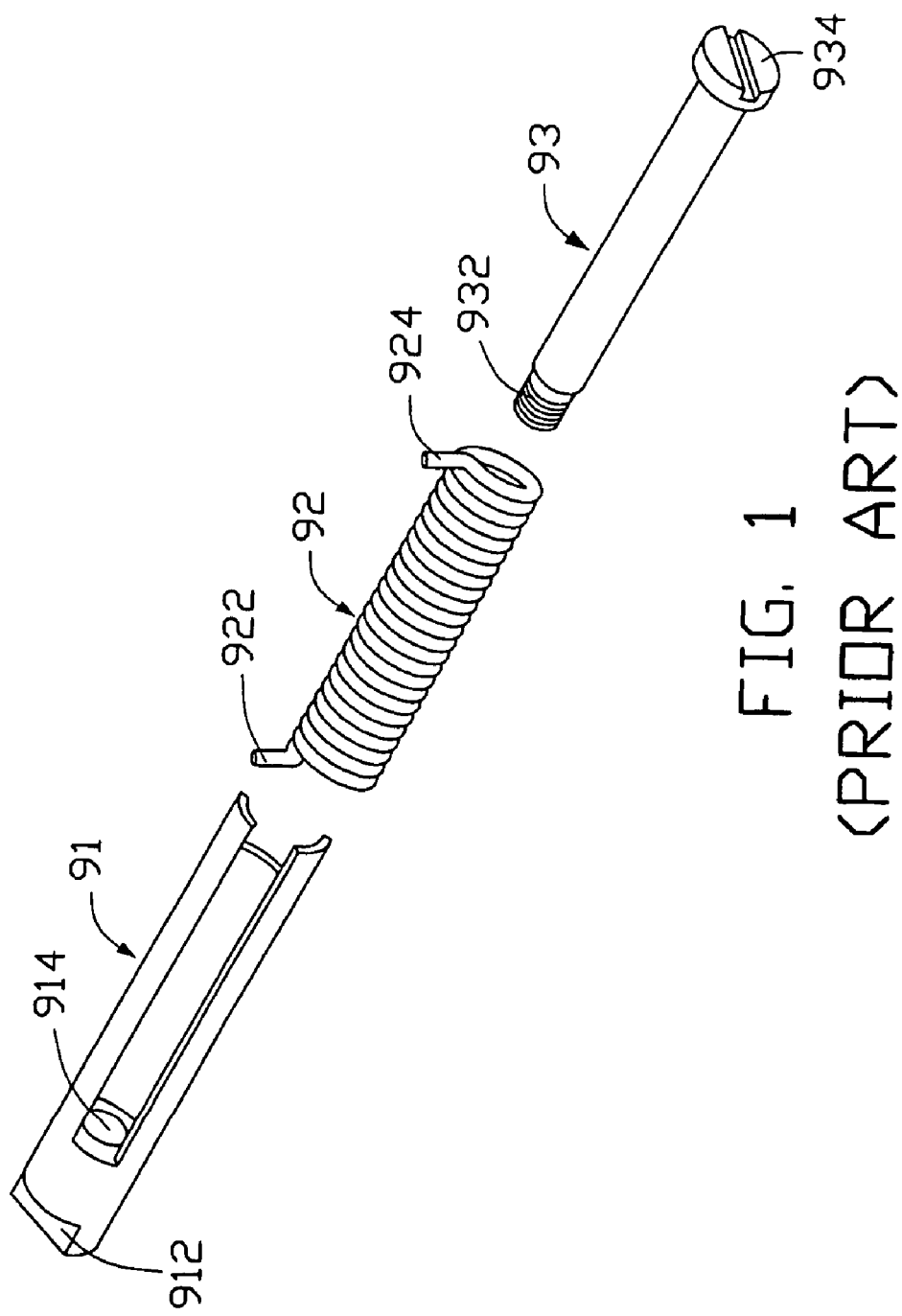
FIG. 1 is an exploded, isometric view of a conventional hinge mechanism.
Figure 2:
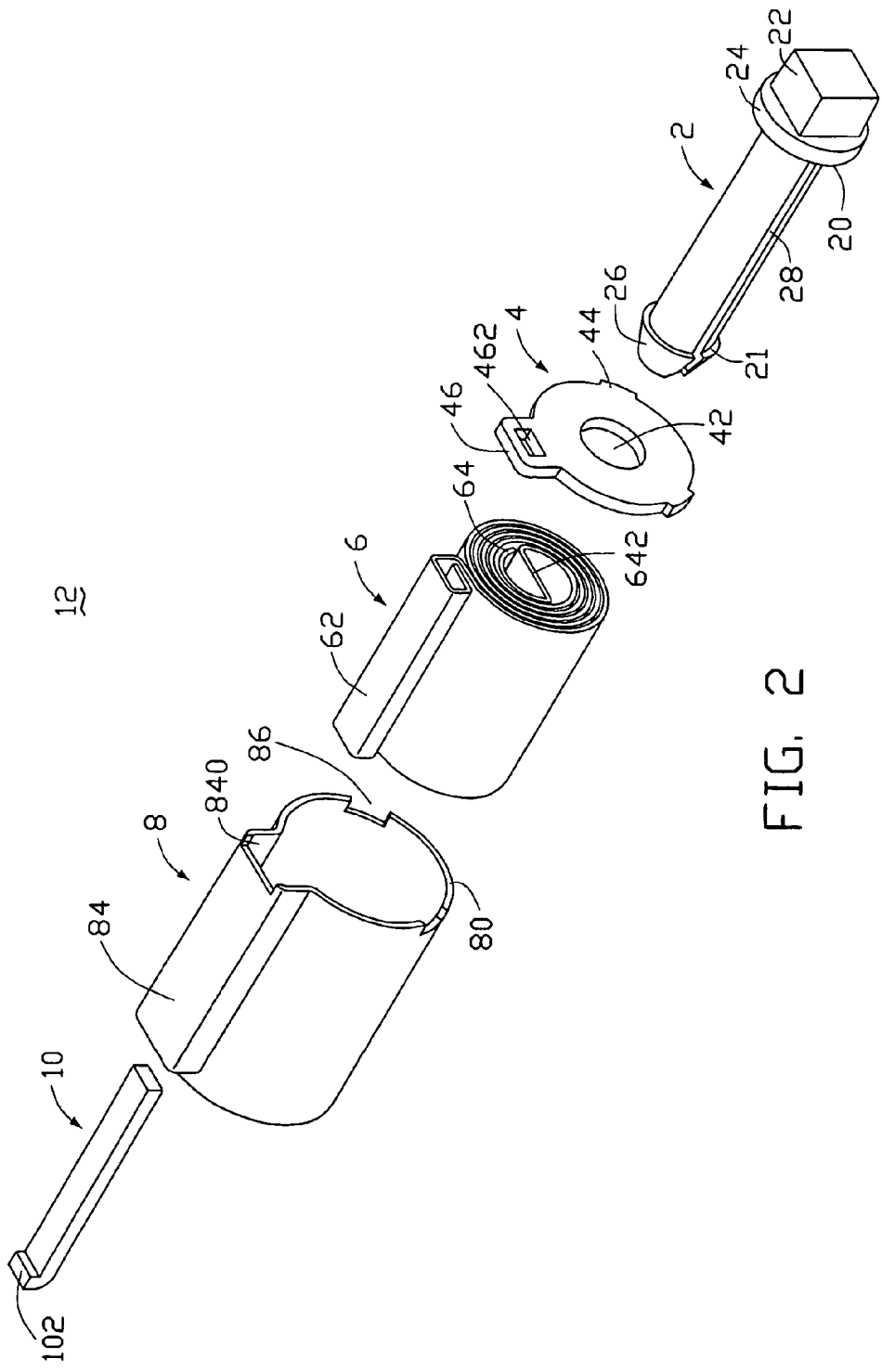
FIG. 2 is an exploded, isometric view of the present hinge mechanism, in accordance with a preferred embodiment thereof.
Figure 3:
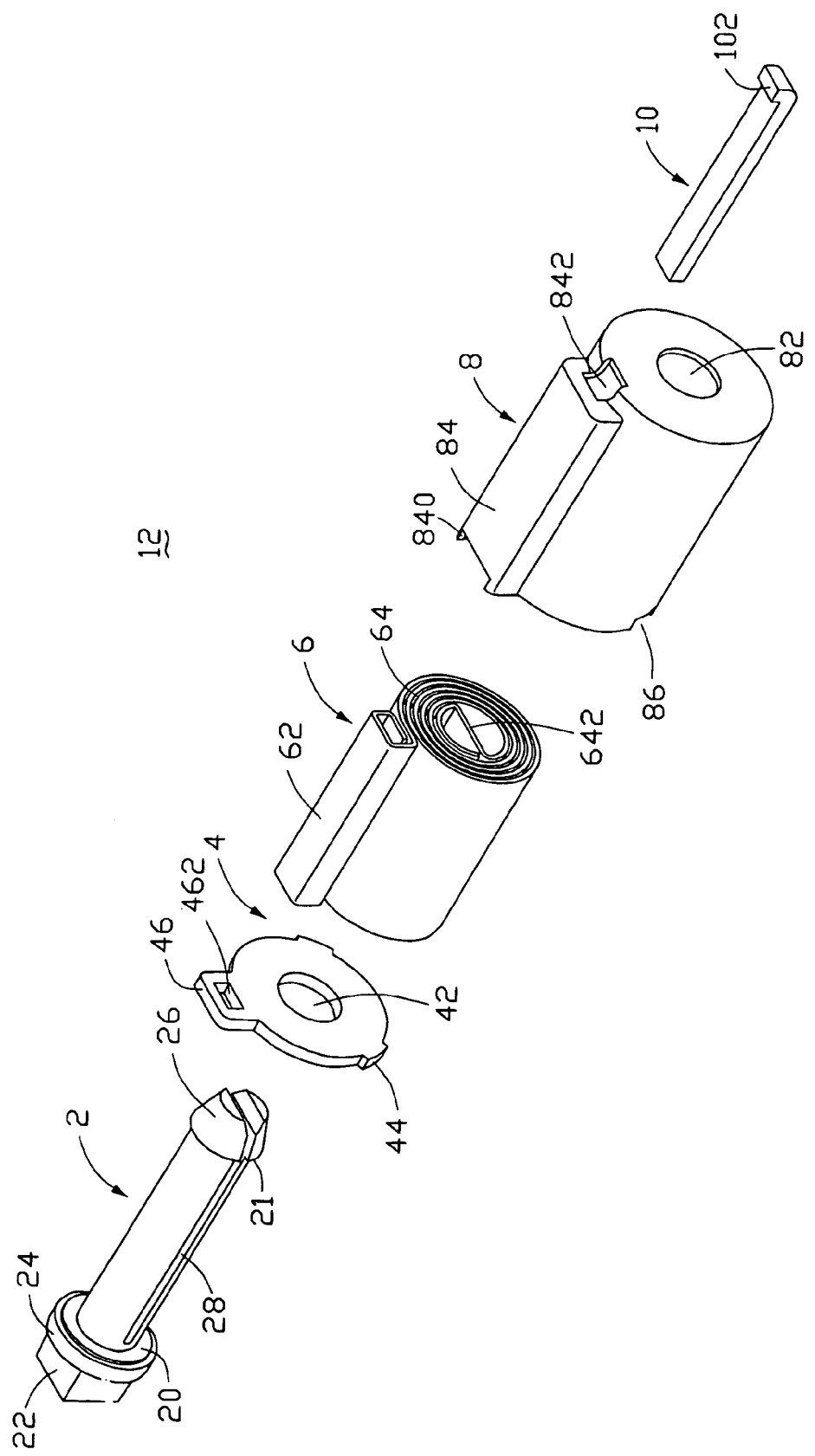
FIG. 3 is similar to FIG. 2, but viewed from an opposite direction.
Figure 4:
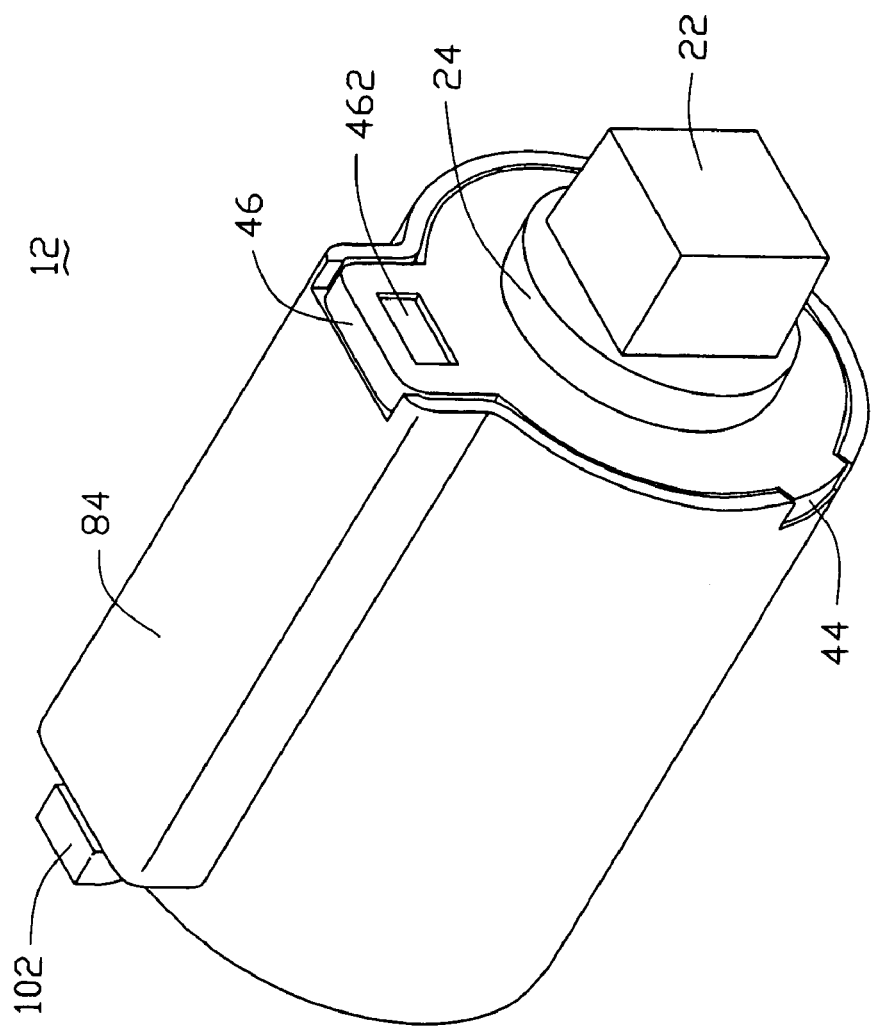
FIG. 4 is an assembled, isometric view of the hinge mechanism of FIG. 2.
Figure 5:
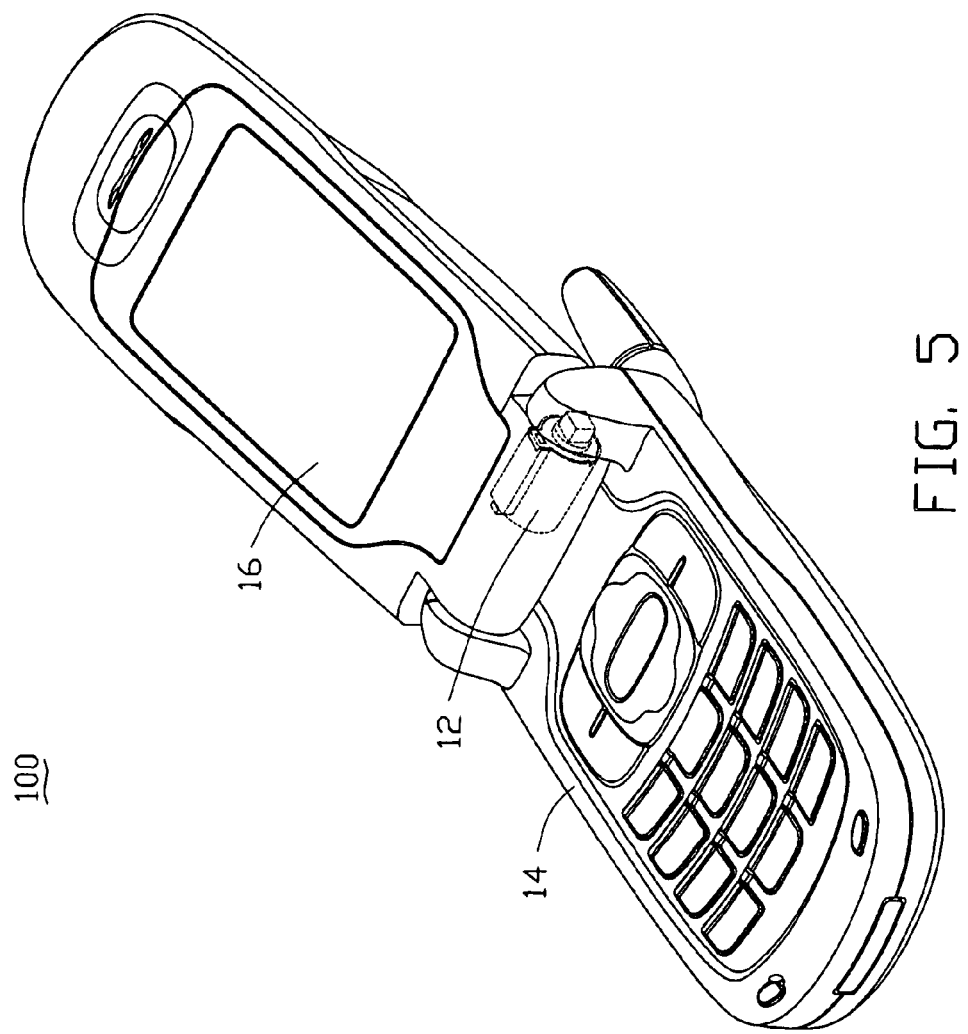
FIG. 5 is an isometric view of an electronic device employing the hinge mechanism of FIG. 4.

Referring to FIG. 2 through FIG. 4, a hinge mechanism 12 includes a main shaft 2, a washer 4, a torsion spring 6, a housing 8 and a pin 10. FIG. 5, in turn shows the hinge mechanism 12 in use within a mobile phone 100 having a main housing 14 and a cover 16, in accordance with a preferred embodiment. The hinge mechanism 12 is shown and detailed as follows for the purposes of providing a simple description of the preferred embodiment thereof, and the embodiments thereof are not to be construed as being limited to the following description.

The main shaft 2 is approximately column-shaped and has a first shaft end 20 and an opposite second shaft end 21. A fixing portion 22 and a stopping portion 24 (e.g., a circular member affixed to the main shaft 2) are formed at the first shaft end 20, and a flange 26 is formed at the second shaft end 21 of the main shaft 2. The flange 26 is beneficially in the shape of a frustum of a cone, easing its insertion through a hole 82 within the housing 8 but making it difficult to remove thereafter. A slot 28 is defined in the main shaft 2 and runs along an axis thereof. The slot 28 runs from a side of the stopping portion 24 facing the flange 26 and through the flange 26. The fixing portion 22 is used to engage with the main housing 14 of the mobile phone 100. The stopping portion 24 and the flange 26 are each configured for stopping/preventing the main shaft 2 from becoming disassembled from the hinge mechanism 12 or from at least sliding out of place relative to remainder of the assembly.

The washer 4 is approximately ring-shaped. A central hole 42 is defined in the washer 4 along a central axis thereof. The washer 4 forms two protrusions 44 and a catch piece 46 at the edge/outer periphery thereof. The protrusions 44 and the catch piece 46 are arranged symmetrically along the outer periphery of the washer 4. A rectangular hole 462 is defined in the catch piece 46.

The torsion spring 6 is formed of a piece of metal sheet. The metal sheet coils into several layers of approximate cylinders (i.e., multiple essentially cylindrical coils) to form the main portion of the torsion spring 6. An end portion of the outside layer of the torsion spring 6 is bent into a hollow, approximately cuboid-shaped (i.e., a rectangular-parallelepiped shape) mounting portion 62. An end of the inside layer of the torsion spring 6 coils into a holding portion 64, which is substantially hollow and specifically configured for receiving the main shaft 2 therein. The cross-section of the holding portion 64 is "S" shaped. The central section of the holding portion 64 is a flat holding piece 642, which extends at least part of the length of the torsion spring 6 (more advantageously, substantially, if not all, the length thereof, to promote better engagement with the slot 28 of the main shaft 2). The holding piece 642 engages the slot 28 of the main shaft 2, upon insertion of the main shaft 2 into the holding portion 64 of the torsion spring 6. The torsion spring 6 is received in the housing 8.

The housing 8 is approximately in the shape of a hollow cylinder. The housing 8 has an open end 80 and a second end, which has a hole 82 therein. A hollow projection 84 is formed on the sidewall of the housing 8 along a line parallel to an axis of the housing 8. A gap 840 is defined at the open end 80 of the projection 84. Accordingly, the housing 8, with its projection 84, is appropriately configured for receiving the torsion spring 6, with its mounting portion 62, therein. An inserting hole 842 is defined at the opposite end of the projection 84. A figure of the open end 80 is matingly the same as the section figure of the washer 4. Two grooves 86 are defined at the open end 80. Positions of the gap 840 and the grooves 86 correspond to the positions of the catch piece 46 and the protrusions 44 of the washer 4, so that the washer 4 can be received in the open end 80 of the housing 8. The projection 84 of the housing 8 is used to engage with the cover 16 of the mobile phone 100.

The pin 10 is cuboid-shaped and has a hook 102 at one end thereof. The pin 10 is contained in the projection 84 of the housing 8 and, more specifically, is slidingly inserted into the mounting portion 62 of the torsion spring 6. The hook 102 of the pin 10 thus engages with the one end of the projection 84 where the inserting hole 842 is located.

When assembling the hinge mechanism 12, firstly, the torsion spring 6 is placed into the housing 8, and the mounting portion 62 is directed into the projection 84. Next, the washer 4 is mounted at the open end 80 of the housing 8. The catch piece 46 and the protrusions 44 of the washer 4 are respectively accepted in the gap 840 and the grooves 86 of the housing 8. Then, the main shaft 2 is sequentially run through the central hole 42 of the washer 4, the holding portion 64 of the torsion spring 6, and the hole 82 of the housing 8, with the holding piece 642 of the torsion spring 6, in turn, running through the slot 28 of the main shaft 2. During the process of running through the hole 82 of the housing 8, the flange 26 deforms and is locked at the opposite end of the open end 80 of the housing 8 because a maximum diameter of the flange 26 is larger than that of the hole 82. The stopping portion 24 is stopped by the washer 4 as a diameter of the stopping portion 24 is larger than that of the central hole 42 of the washer 4, thereby helping to properly position the main shaft 2. Finally, the pin 10 is sequentially inserted into the inserting hole 842 of the housing 8, the mounting portion 62 of the torsion spring 6, and the rectangular hole 462 of the washer 4. The pin 10 is stopped at the side of the inserting hole 842 by the hook 102. The hook 102 is fixed on the housing 8 by, e.g., gluing, plastering, soldering, or melting/welding. The hinge mechanism 12 is thereby assembled, as best shown in FIG. 4. The mounting portion 62 of the torsion spring 6 is fixed to the housing 8, and the holding portion 64 of the torsion spring 6 is fixed to the main shaft 2.

Referring to FIG. 5, the hinge mechanism 12 is used in the exemplary mobile phone 100 having the main housing 14 and the cover 16. The assembled hinge mechanism 12 is assembled to connecting portions (not shown) of the main housing 14 and the cover 16. The housing 8 engages with the cover 16 by the projection 84. The housing 8 can rotate together with the cover 16 relative to the main housing 14. The main shaft 2 engages with the main housing 14 by the fixing portion 22. The mounting portion 62 of the torsion spring 6 is fixed relative to the cover 16, and the holding portion 64 of the torsion spring 6 is fixed relative to the main housing 14. When the cover 16 is closed, the torsion spring 6 is in a twisted state, and the cover 16 is fixed to the main housing 14 by a fixing structure or a magnetic mechanism. The hinge mechanism 12 is in an unsteady state, and the cover 16 is apt to open relative to the main housing 15.

When the cover 14 needs to be opened, the fixing structure or magnetic mechanism is manually released. The holding portion 64 of the torsion spring 6 is released and rotates due to the resilient force of the torsion spring 6. Therefore, the cover 16 rotates together with the housing 8, since the housing 8 is fixed relative to the mounting portion 62. As such, the cover 16 is opened. The torsion spring 6 is completely released, and the cover 16 stops rotating. The cover 16 can also be opened to a prearranged angle, limited by a structural limitation of the main housing 14 and the cover 16. When closing the cover 16, the cover 16 is rotated manually and then fixed to the main housing 14 by the fixing structure or the magnetic mechanism.

In alternative embodiment, the pin 10 can be omitted, and the holding portion 64 of the torsion spring 6 could fixed to the housing 8 directly by pasting/gluing, soldering, or melting, for example. The slot 28 of the main shaft 2 can also be omitted, so long as the holding portion 64 is eliminated and the main shaft 2 is then otherwise attached to the torsion spring 6 (e.g., adhesively or metallurgically). The washer 4 also can be omitted. The torsion spring 6 can be of another form, such as a column helical spring, as long as it can attach to and/or engage with the housing 8. The flange 26 of the main shaft 2 can be replaced with another stopping mechanism, such as a ring or a nut, arranged at the second shaft end 21 of the main shaft 2, in order to stop the main shaft 2 from becoming disassembled from the housing 8. As a further alternate, it is recognized that the hinge mechanism 12 could have potential applications beyond foldable electronic devices (e.g., cabinet doors), and such uses are considered to be within the scope of use of this hinge assembly 12.

It is believed that the embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A hinge mechanism comprising:
   a main shaft having a first shaft end and an opposite second shaft end, the main shaft being provided with a stopping mechanism at the first shaft end;
   a cylindrical torsion spring surrounding the main shaft, the torsion spring comprising a coiled sheet forming a plurality of loops and having a substantially hollow interior and an exterior, wherein the plurality of loops are substantially concentric; and
   a housing being cylinder-shaped and hollow, the housing having a first housing end and a second housing end, the first housing end thereof being open and sized to receive the torsion spring therein, the second housing end having a shaft-receiving opening sized and configured to receive the main shaft therein;
   wherein the torsion spring is inserted into the housing, the main shaft is inserted into the torsion spring, rotatable with the interior of the torsion spring, and received in the second opening of the housing, the housing is rotatable with the exterior of the torsion spring so that the housing is rotatable relative to the main shaft and the stopping mechanism prevents the main shaft from becoming disassembled from the housing.

2. The hinge mechanism as claimed in claim 1, wherein the exterior of the torsion spring forms a mounting portion and the interior of the torsion spring forms a holding portion.

3. The hinge mechanism as claimed in claim 2, wherein a cross-section of the holding portion is essentially "S" shaped, the holding portion having a flat holding piece extending at least partially through a central section thereof.

4. The hinge mechanism as claimed in claim 3, wherein the main shaft has a slot defined therein, the slot running along an axis of the main shaft from the second shaft end, the flat holding piece of the torsion spring being inserted into the slot upon assembly of the hinge mechanism.

5. The hinge mechanism as claimed in claim 2, wherein the housing further defines a projection on a sidewall thereof, the projection extending along a line parallel to an axis of the housing, the projection having a hollow interior configured for receiving the mounting portion of to torsion spring.

6. The hinge mechanism as claimed in claim 1, wherein the hinge mechanism further comprises a washer defining a central hole and a rectangular hole therein, the washer being placed in the first open end of the housing, the main shaft run through the central hole of the washer.

7. The hinge mechanism as claimed in claim 6, wherein the hinge mechanism further comprises a pin, the exterior of the torsion spring forming a mounting portion, the housing having an inserting hole at the second housing end thereof, the pin being inserted into the inserting hole of the housing, through the mounting portion of the torsion spring, and into the rectangular hole of the washer.

8. The hinge mechanism as claimed in claim 1, wherein the main shaft further includes a flange formed on the second shaft end, the flange being capable of insertion into the shaft-receiving opening in the second housing end.

9. An electronic device comprising:
   a main housing;
   a cover; and
   a hinge mechanism rotatably hinging the main housing and the cover, the hinge mechanism comprising:
   a main shaft having a first shaft end and an opposite second shaft end, the main shaft being provided with a stopping mechanism at the first shaft end;
   a cylindrical torsion spring surrounding the main shaft, the torsion spring comprising coiled sheet forming a plurality of loops and having a substantially hollow inside section and an outside section, wherein the plurality of loops are substantially concentric; and
   a housing being cylinder-shaped and hollow, the housing having a first housing end and a second housing end, the first housing end thereof being open and sized to receive the torsion spring therein, the second housing end having a shaft-receiving opening sized and configured to receive the main shaft therein;
   wherein the torsion spring is inserted into the housing, the main shaft is inserted into the torsion spring, rotatable with the inside section of the torsion spring, and received in the second opening of the housing, the housing is rotatable with the outside section of the torsion sprint so that the housing is rotatable relative to the main shaft, and the stopping mechanism prevents the main shaft from becoming disassembled from the housing.

10. The electronic device as claimed in claim 9, wherein the outside section of the torsion spring further defines a mounting portion, and the inside section of the torsion spring defines a holding portion.

11. The electronic device as claimed in claim 10, wherein a cross-section of the holding portion is "S" shaped, and the holding portion includes a flat holding piece in a central section thereof.

12. The electronic device as claimed in claim 11, wherein the main shaft has defined therein a slot running along an axis thereof, the flat holding piece of the torsion spring being inserted into the slot.

13. The electronic device as claimed in claim 10, wherein the hinge mechanism further comprises a washer defining a central hole and a rectangular hole therein, the washer being placed in the first open end of the housing, the main shaft running through the central hole of the washer.

14. The electronic device as claimed in claim 13, wherein the hinge mechanism further comprises a pin, the housing having an inserting hole in the second housing end, the pin being inserted into the inserting hole of the housing, through the mounting portion of the torsion spring, and into the rectangular hole of the washer.

* * * * *